United States Patent [19]

Lumpkin

[11] 4,408,102
[45] Oct. 4, 1983

[54] TWO-WIRE EXCHANGE TELEPHONE SYSTEM

[76] Inventor: Steven B. Lumpkin, 164 Acadian Dr., Lafayette, La. 70503

[21] Appl. No.: 257,596

[22] Filed: Apr. 27, 1981

[51] Int. Cl.³ .................... H04M 1/72; H04M 9/02
[52] U.S. Cl. ........................ 179/99 H; 179/18 BF; 179/99 P; 179/99 A
[58] Field of Search ............ 179/1 H, 18 AD, 18 BF, 179/99 R, 99 A, 99 H, 99 P

[56] References Cited

U.S. PATENT DOCUMENTS

| | | | |
|---|---|---|---|
| 3,806,665 | 4/1974 | Goldberg | 179/99 H |
| 4,031,329 | 6/1977 | Saxon | 179/18 BF |
| 4,056,695 | 11/1977 | Angner et al. | 179/99 H |
| 4,100,375 | 7/1978 | Noller | 179/99 H X |
| 4,107,473 | 8/1978 | Pierce | 179/18 BF |
| 4,194,093 | 3/1980 | Davis, Jr. et al. | 179/99 R |
| 4,311,880 | 1/1982 | Balzer et al. | 179/99 H |
| 4,377,726 | 3/1983 | Schiffbauer et al. | 179/1 H |

Primary Examiner—G. Z. Rubinson
Assistant Examiner—Keith E. George
Attorney, Agent, or Firm—Thomas S. Keaty

[57] ABSTRACT

Two wire phone exchange system which provides signalling, intercom and paging functions. The system monitors and detects either a dual tone multi-frequency tone or a single tone generated on the line at the local telephone, activates a relay and places a calling party on hold and connects music to the incoming line. A party on hold is reconnected to the answering telephone by depressing a tone signal generating key button. There is an audible warning tone reminder for calls placed on hold which are not picked up after some desired time. The system also provides in-house intercom and paging functions and a release from these functions. When several local telephone instruments are connected on the same line, this system allows the recipient of a call to receive the call at any of the telephones by depressing a tone generating key button.

11 Claims, 6 Drawing Figures

TWO-WIRE EXCHANGE TELEPHONE SYSTEM

BACKGROUND OF THE INVENTION

1. Field of the Invention

The present invention relates to private branch telephone exchange systems and, more particularly, to a two-wire exchange system which is responsive to a tone signal from the local telephone instrument for placing the calling party on "hold" and connecting the incoming line to music on hold. The system may also connect the local instrument to an intercom paging system having paging, incoming call waiting, and party-on-hold warning tones.

2. General Background and Prior Art

The telephone and telecommunication industries often employ various paging, signalling, and intercom functions as part of an overall telephone network for use in locations such as offices, hospitals, industrial plants, and the like where incoming calls are distributed from a central keyboard or operator to a plurality of persons each having individual telephone units.

Most of these prior art type telecommunications networks which would perform many of the same signalling, intercom and paging functions, but which could be utilized with simple two wire telephone units since individual two wire telephone instruments are a substantial savings to the company which installs telephones when compared to conventional multi-wire intercom and telephone network systems and their complex electronic components.

It would be desirable to have all of those known conventional functions produced by prior art type telecommunication elements and networks in a simple two wire exchange unit.

Various telecommunication functions such as signalling, intercom, and paging functions would be desirable features useful to the consumer in connection with simple, parallel connected two wire telephone instruments.

Some prior art systems utilize a paging system which receives outside calls on an incoming board provided with a plurality of separate buttons each of which is interfaced with a single telephone instrument as, for example, a central office keyboard having buttons for each individual office or telephone line throughout the system.

Some prior art telecommunication systems or networks utilize a paging or intercom system which places the incoming call on "hold" and supplies music to the distant party while the keyboard operator or receptionist locates the desired recipient of the call. The music can be supplied by nearby am or fm radio stations through the tuner which is known in the art and available on prior art type commercially available telephone systems.

Another desirable feature of telecommunication or intercom systems would be the ability to receive incoming calls while the system is being used to provide an intercom function between separate common connected instruments.

Some prior art type switching systems or intercom systems utilize the technique of switching responsive to certain tones which are generated by the individual phone instruments. In this regard, see U.S. Pat. No. 4,031,329 issued to B. R. Saxton and entitlted "Time Limited Telephone Paging" which employs a relay switch actuated by dual frequency tones. Also, U.S. Pat. No. 4,081,614 issued to James Dahlquist and entitled "Supervised Single Link Telephone System" teaches such switching technique responsive to the generation of dual tones by depressing the asterisk push button at the administrative telephone set.

U.S. Pat. No. 4,100,375 issued to David L. Noller and entitled "Telephone Intercom and Remote Control System" employs a standard telephone instrument having dual tone multifrequency (DTMF) signalling. The telephone hook switch sensing circuit provides a trigger to connect a tone decoder across the talk path for a period of time established by a time delay circuit. When the instrument is tone dialed, the output of the tone decoder is fed respectively to: a gate circuit which switches the telephone instrument from the local intercom battery to an outside telephone line; a "hold" feature circuit which places the outside call on "hold"; a remote control circuit which turns on and off devices remote from the system; or to individual bells or other instruments within the system.

Music on "hold" functions in key telephone systems are seen in U.S. Pat. No. 3,909,553 issued to Richard A. Marshall, and U.S. Pat. No. 4,056,695 issued to Ronald James Angner and James Lacy.

Various other telephone/intercom systems controlled by tone generation are seen in other U.S. patents. For example, in U.S. Pat. No. 3,941,944 issued to Alexander McIntosh, there is provided a signalling device for key telephone systems such as intercom systems. There is taught in that patent a system for decoding the tone output from touch tone telephones, indicating which digit has been operated and selectively signalling the called party.

In U.S. Pat. No. 4,004,106 issued to Gerald Yachabach, et al., there is provided "A Line Circuit for Use with a Key Telephone System." The Yachabach patent provides a system for indicating an incoming call, a call placed on "hold," and an answered call. There is further provided a means for automatically indicating that the incoming call has been placed on "hold" for a pre-determined time period. There is further provided a solid state device which switches telephone instrument lamp current for visual indication of the various line circuit operations.

U.S. Pat. No. 4,037,058 issued to Robert David Stine provides a control circuit including a mechanical interrupter which provides a plurality of interrupted ringing signal bursts when one of a plurality of intercom stations goes off hook and first initiates a call to another of the plurality of intercom stations.

U.S. Pat. No. 4,081,624 issued to Steven Kerman and Fumio Tsutsumi entitled "Key Telephone Intercom System" uses three leads to connect plural telephones and an intercom line control circuit. The leads comprise two walking circuit leads and one control lead, typical of prior art multi-wire exchange systems. Exclusion circuits in each of the telephones are controlled by signals applied on a single control lead to: (1) allow a telephone to seize the intercom line circuit when it is in an idle state; (2) allow the called telephone (which signal is via a separate pair of calling leads) to answer without being excluded; and (3) exclude all other telephones from the intercom line circuit after the calling telephone has seized the intercom line circuit.

In U.S. Pat. No. 4,088,846 issued to James R. McEowen there is provided a "hold-plus-intercom for single-line stations." This multi-wire system is for single line customers and utilizes existing non-key telephone sets and four conductor wiring planned together with an additional adjunct unit per telephone instrument and a common control unit. Hold, broadcast intercom, and their associated visual signals are controlled by each adjunct unit which is interposed between the associated telephone set and the four conductor cable.

Another recent patent is U.S. Pat. No. 4,107,473 issued to Ben Pierce and entitled "Two Way Paging System Transmission Direction Sensing and Control Apparatus and Method." In the Pierce patent, a paging system is entered through appropriate telephone equipment at a master station to supply an audio paging output at a remote station. A paging amplifier is connected to drive a speaker at the remote station to provide the audio output. A direction sensing circuit is disposed between the master and remote stations which operates to sense time relationship between two signals appearing at two separate points within the direction sensing circuit. One time relationship between the two signals indicates a master station transmission and control, and another time relationship indicates a remote station transmission.

In U.S. Pat. No. 1,899,084 issued to George R. Eaton and Glen Kiner, there is provided a telephone system relating to automatic telephone systems of the two-wire type. The Eaton-Kiner patent is directed to older telephones of the rotary dial type.

Two recently issued patents having Harry R. Rasmussen as inventor on the first (U.S. Pat. No. 4,132,860) and Harry R. Rasmussen and Gene Kimzey and Robert Hailey as inventors on the second (U.S. Pat. No. 4,133,985) are both directed to key telephone systems. U.S. Pat. No. 4,132,860 provides a "hold" control for a key telephone system which is primarily directed to a two line system that is particularly tailored for customers needing less than five telephone lines from a central office. The key telephone system in the '985 patent utilizes visual indicator lights and manual control buttons for each telephone instrument along with the control circuitry. Visual indicator lights and manual control buttons for each telephone are packaged in a small compact unit that is readily attachable to an existing standard telephone instrument of the type intended for single line use.

These prior art systems suffer in that they do not provide all of the desirable signalling, intercom, and paging functions desirable to a complete telephone system which system employs only two wires in the exchange.

Thus, it is an object of the present invention to provide a two wire exchange system providing a plurality of desirable signalling, intercom and paging functions.

It is an object of the present invention to provide a two wire exchange system which provides means for monitoring and detecting a tone signalling system in which a tone which may be a dual tone multifrequency tone or a single tone for rotary dial telephones, is generated on the line at the local telephone instrument and the subsequent activation of a relay which places a calling party on hold.

It is another object of the present invention to provide a release hold capability which allows a party on hold to be easily and quickly reconnected to the answering telephone instrument line by the depressing of a tone signal generating key buttons.

It is another object of the present invention to provide a two wire exchange system for telephones in which any one of the plurality of common connected telephones in the system can be used by the recipient of a call to quickly receive an incoming call by the depression of a tone signal generating key button.

It is another object of the present invention to provide a tone remainder for use with two wire exchange systems in which calls on hold which are not picked up will automatically generate a warning tone at desired intervals until the recipient of the call reconnects with the caller placed on hold.

It is another object of the present invention to provide a "screen call" function which answers calls and places them on hold responsive to the depression of a tone signal generating key button.

It is another object of the present invention to provide an in-house intercom and paging system for use with the two wire exchange system, and a release from paging and in-house intercom function associated therewith.

SUMMARY OF THE INVENTION

The invention comprises a two wire phone exchange system including a first terminating means for connection to an incoming central office line and a second terminating means for connection to a local telepone instrument. The system provides a means responsive to a preselected signal tone for activating a hold relay, which disconnects the local telephone instrument from the central office line and connects it to an external music signal. The hold relay also activates a light emitting diode (LED) to indicate that the hold function is being used. The invention also provides a means responsive to the preselected signal tone for de-activating the hold relay and disconnecting the local telephone from the external music signal and reconnecting the local telephone instrument to the central office line.

Another aspect of the invention includes means responsive to a preselected signal tone whereby the DTMF timer produces a signal which activates the page control circuit and a begin paging beep tone is produced through the local telephone instrument. That is, the user hears the beep tone through the hand set of his telephone. The beep indicates that for the next seven seconds the local telephone instrument will be coupled to an external speaker or P.A. system and paging will be possible. The paging capability is disabled after seven seconds but it is possible to repage by depressing the switch hook of the local telephone instrument.

And, when there is no calling party present and it is desired to page an individual over the intercom system, the invention includes means responsive to an extended duration preselected signal tone whereby the local telephone instsrument is disconnected from the central office line and the intercom mode is activated. The paged party may pick up the receiver of a telephone instrument on the same line and intercom conversation may ensue. While in the intercom mode, all incoming calls generate a tone to the local telephone instruments and to an external speaker or P.A. system. The incoming call may be answered by the generation of a preselected signal tone on either of the instruments being used for the intercom function.

BRIEF DESCRIPTION OF THE DRAWINGS

For a further understanding of the nature and object of the present invention, reference should be had to the following detailed description, taken in conjunction with the accompanying drawings, in which like parts are given like reference numerals and, wherein.

DETAILED DESCRIPTION OF THE DRAWINGS

Figure 1:
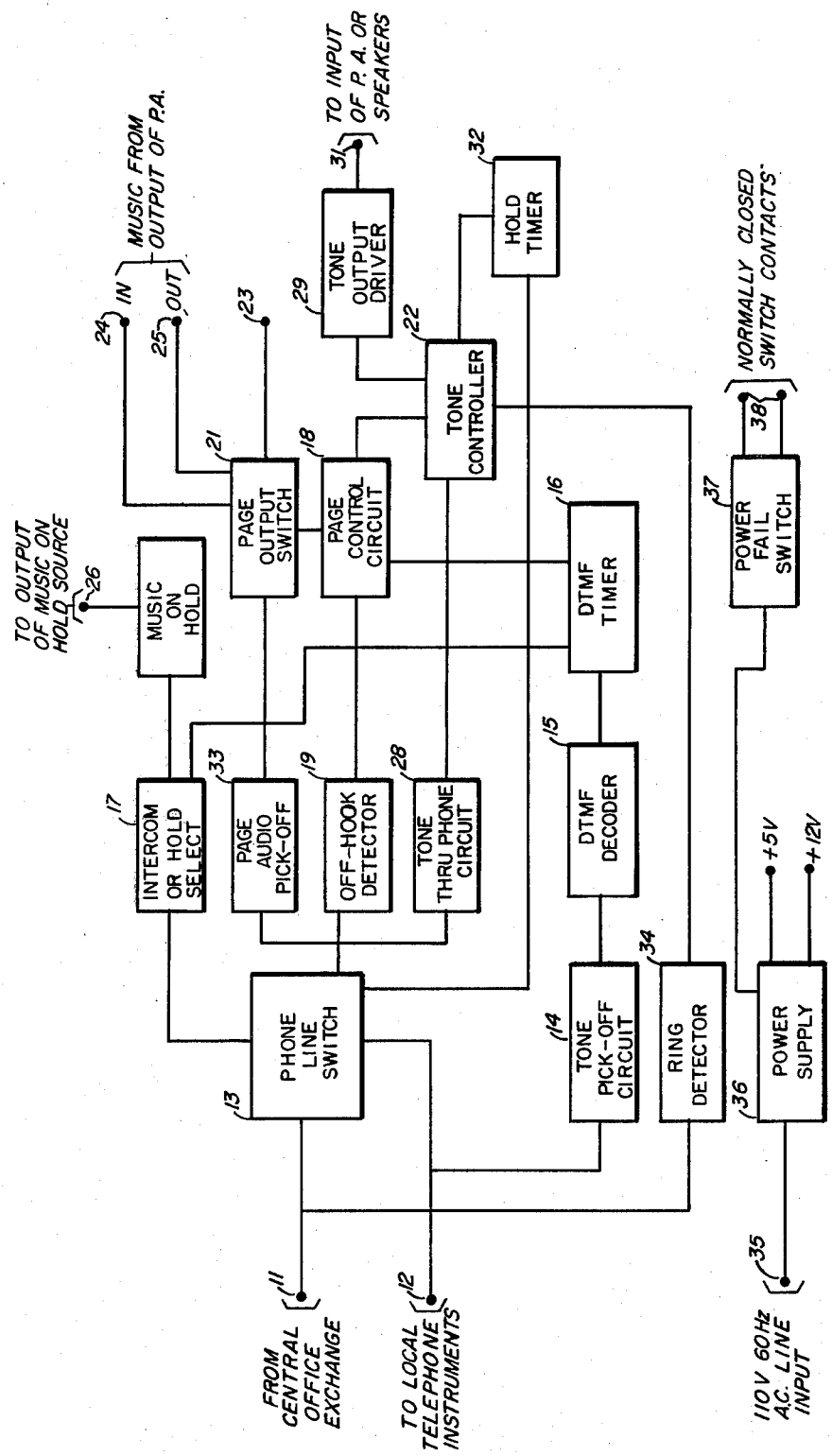
FIG. 1 is a block diagram of the preferred embodiment of the two wire exchange apparatuses of the present invention.

One embodiment of the system of the invention is shown in block diagram in FIG. 1. A first terminating means such as a telephone line is connected to the central office exchange. A second terminating means such as terminal 12 is provided for connection to one or more parallel connected conventional telephone instruments, preferably incorporating dual tone multifrequency signaling. Within the system of FIG. 1, both terminals 11 and 12 are connected to a phone line switch 13. Terminal 12 is also connected to a tone pick-off circuit 14. The output of the circuit 14 is connected to the input of a dual tone multifrequency (DTMF) or single tone decoder 15 for rotary dial telephones with 3100 Hz oscillators (encoders), the output of which is connected to a DTMF or single tone timer circuit 16. The outputs of the timer 16 are connected to an intercom or hold selector 17 and to a page control circuit 18. The intercom or hold selector circuit 17 is connected back to control the operation of the phone line switch 13. An off hook detector 19 is connected between the phone line switch 13 and a page control circuit 18, the output of which is connected to both a page output switch 21 and a tone controller 22. The page output switch 21 functions to place an audio signal from the telephone instrument transmitter on the page output terminal 23 which is connected to an external speaker or public address system for the communication of paging information. The page output switch 21 is also connected to the public address music broadcast system terminals 24 and 25 in order to mute the music during a paging operation. The public address music signal is connected to input terminal 24, through the music interrupt switch of the page output switch 21 and out via output terminal 25. An externally produced music signal connected to input terminal 26 is applied to a holding parties line through a music on hold circuit 27.

The tone controller 22, which receives input from the page control circuit 18, a ring detector 34 and a hold timer 32, is connected back through a tone-through-phone circuit 28 to the phone line switch 13. The output of the tone controller 22 is also connected to a tone output driver 29 having an output terminal 31. The hold timer 32 is connected between the phone line switch 13 and the tone controller 22. A page audio pick-off circuit 33 is connected from the phone line switch 13 to the input of the page output switch 21 to couple audio signals from the telephone instrument into the paging system as mentioned briefly above. A ring detector 34 is connected from the phone input terminal 11 to the tone controller 22. External a.c. power for operation of the system of FIG. 1 is connected through a terminal 35 to the input of a d.c. power supply 36, the output of which is coupled to the rest of the system through a power fail switch 37. In the event of failure of commercial a.c. power, the system responds by opening normally closed contacts 38, resetting itself and establishing a direct connection between terminals 11 and 12 through the phone line switch 13 so that the telephone instrument continues to operate normally on a central office battery.

In general, the system of FIG. 1 may be operated in either a paging mode, where a calling party requires the paging of a receiving party to handle an incoming call, and in an intercom mode where no calling party is present and a local party merely desires to page and talk with another local party on the same line.

PAGING MODE

An incoming telephone call on terminal 11 is connected through the phone line switch 13 to the telephone instrument attached to terminal 12. Assuming that the calling party would like to speak to an individual requiring a paging operation, the party answering the phone presses the "asterisk" button on the telephone instrument and thereby applies a multifrequency tone comprising two superimposed oscillator frequencies to the line. That is, depression of the "asterisk" button on the conventional DTMF telephone instrument generates a preselected signalling tone comprising two superimposed tones; one having a frequency of 941 Hz and the other having a frequency of 1209 Hz or a single button with 3100 Hz for rotary dial telephones. These two tones are coupled through the tone pick-off circuit 14 to the DTMF or single tone decoder 15 for rotary dial telephones. Upon recognition of the presence of both of these two superimposed frequencies, 941 Hz and 1209 Hz or a decoder for 3100 Hz for rotary dial telephones, the decoder 15 triggers the start of the DTMF timer or single tone time 16. After the presence of the tones of approximately seventy-five milliseconds, the timer 16 produces a signal to the intercom or hold select circuit 17 which in turn operates the phone line switch 13 and places the calling party on hold. With the operation of the phone line switch a current holding path and music, via the music on hold circuitry 27, is applied to the line of the calling party. Approximately four seconds after the timer 16 is triggered it produces a signal to the page control circuit 18. If the page control circuit 18 is also simultaneously receiving an indication from the off hook detector 19 that the telephone handset is still off the hook, it produces a control signal to the page output switch 21 to mute the music and place an audio signal on the page output terminal 23. The page audio pick-off 33 couples a talking circuit from the telephone instrument through the page output switch 21 to the page audio output terminal 23 for connection to a speaker or public address system for paging. In the event that the telephone handset is replaced on its switch hook prior to four seconds following the momentary depression of the "asterisk" button or single tone button for 3100 Hz rotary dial telephones, no signal will be produced by the off hook detector 19 at the time the page control circuit 18 receives a "four second" signal from the timer 16 and the calling party will remain on hold without actuating the page control circuit 18.

Assuming the telephone instrument remains "off-hook" and paging is desired, the page control circuit 18 applies a signal to the tone controller 22 at approximately two seconds prior to connecting the telephone to a paging circuit. The tone controller 22 generates a "begin paging" beep tone which is connected through the tone through phone circuit 28 and the phone line switch 13 to the receiver of the telephone instrument connected to terminal 12. Thus, after the expiration of about two seconds after placing the calling party on hold, a "begin page" tone of about two seconds duration is placed into the local telephone instrument so that termination of the tone indicates to the user that the system is ready to receive a paging input for approximately the next seven seconds, under control of the timer 16. After the expiration of seven seconds, the page control circuit 18 disables the paging operation. Should it be desired to repage, simple depression of the switch hook will produce another impulse to the off-hook detector 19 and reactuate the page control circuit and permit repaging of the party for approximately seven seconds.

To answer the page, the paged party merely picks up another telephone instrument connected in parallel with the paging instrument on the terminals 12 and talks to the paging party to find out the nature of the page and the identity of the calling party. Either party, the paging party or the paged party, may depress the asterisk button on their telephone or a button for 3100 Hz on a rotary dial telephone instrument and trigger reconnection to the calling party. Connection of the two tones 941 Hz and 1209 Hz or single tone (3100 Hz) to the tone pick-off circuit 14 and the DTMF or single tone 3100 Hz decoder 15 for about seventy-five milliseconds operates the phone line switch 13 through the intercom or hold select switch 17. Operation of the phone line switch 13 connects terminals 11 and 12 together so that the calling party can speak to the paging party, the paged party, or both. In the event the calling party is left "on hold" for approximately three minutes, the hold timer circuit 32 will be actuated and produce a signal to the tone controller 22 which in turn applies a hold tone warning indication back to the tone output driver 29 and tone controller 22 to the telephone instrument connected to the terminal 12, via the tone through phone circuit 28. The tone controller cyclicly produces one warning tone per second for four seconds and then six seconds of silence to indicate that the party is still on hold.

INTERCOM MODE

In another mode, the system of FIG. 1 may be used where an outside calling party is not present and it is merely desired to page an individual over the intercom system. In this instance, the telephone instrument attached to the terminal 12 is taken off the hook and the asterisk button on the instrument depressed for approximately 2.7 seconds. The tone signals generated by the instrument are coupled through the tone pick-off circuit 14 and the DTMF decoder or single tone decoder 15 to actuate the DTMF or single-tone timer 16. Signals from the timer 16 and the off hook detector 19 actuate the page control circuit 18 so as to couple a voice signal from the page audio pick-off 33 to the page output terminal 23 and mute the public address music via the terminals 24 and 25. The page control circuit 18 also produces a control signal to the tone controller 22 to produce a begin page tone back to the tone through phone input 28 to signal the commencing of paging. When the paged party picks up the receiver of an instrument on the same line and answers, intercom conversation may ensue. If, during the intercom conversation an incoming call is received on input terminal 11, the 20 Hz ringing signal from the telephone central office is coupled through the ring detector 34 to the tone controller 22 which applies a tone to terminal 31 and 12 indicative of the fact that an incoming call is waiting for the telephone instruments then off-hook. If it is desired to answer the call at that point, depression of the asterisk button on either of the instruments produces a multifrequency tone or a single button on a rotary dial telephone to produce a 3100 Hz tone which is coupled through the pick-off circuit 14, and the decoder 15 to the timer 16 which, via the intercom or hold selector circuit 17, connects the phone line switch 13 so that either or both of the telephone instruments can receive the call on the input terminal 11. The ring detector 34 thereby allows the signalling of incoming calls while the telephone instruments are being used in a local intercom mode.

Thus, the system of the invention may be used to provide hold, paging and intercom features to a single two wire telephone line without the addition of any additional signalling or supervisory pair of wires.

Figure 2:
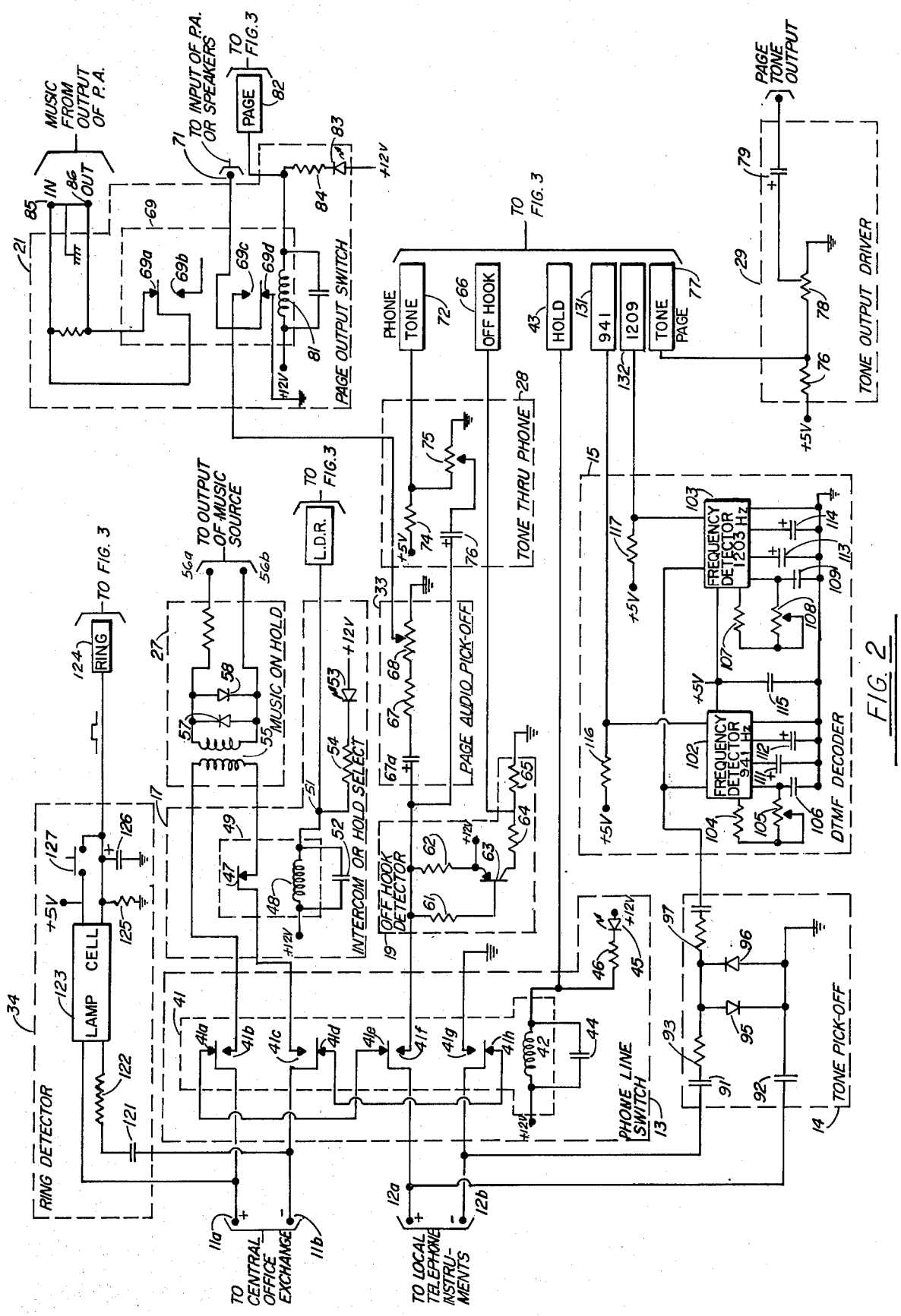
FIG. 2 is a circuit diagram of the telephone interconnected portion of the preferred embodiment of the apparatus of the present invention.
Figure 3:
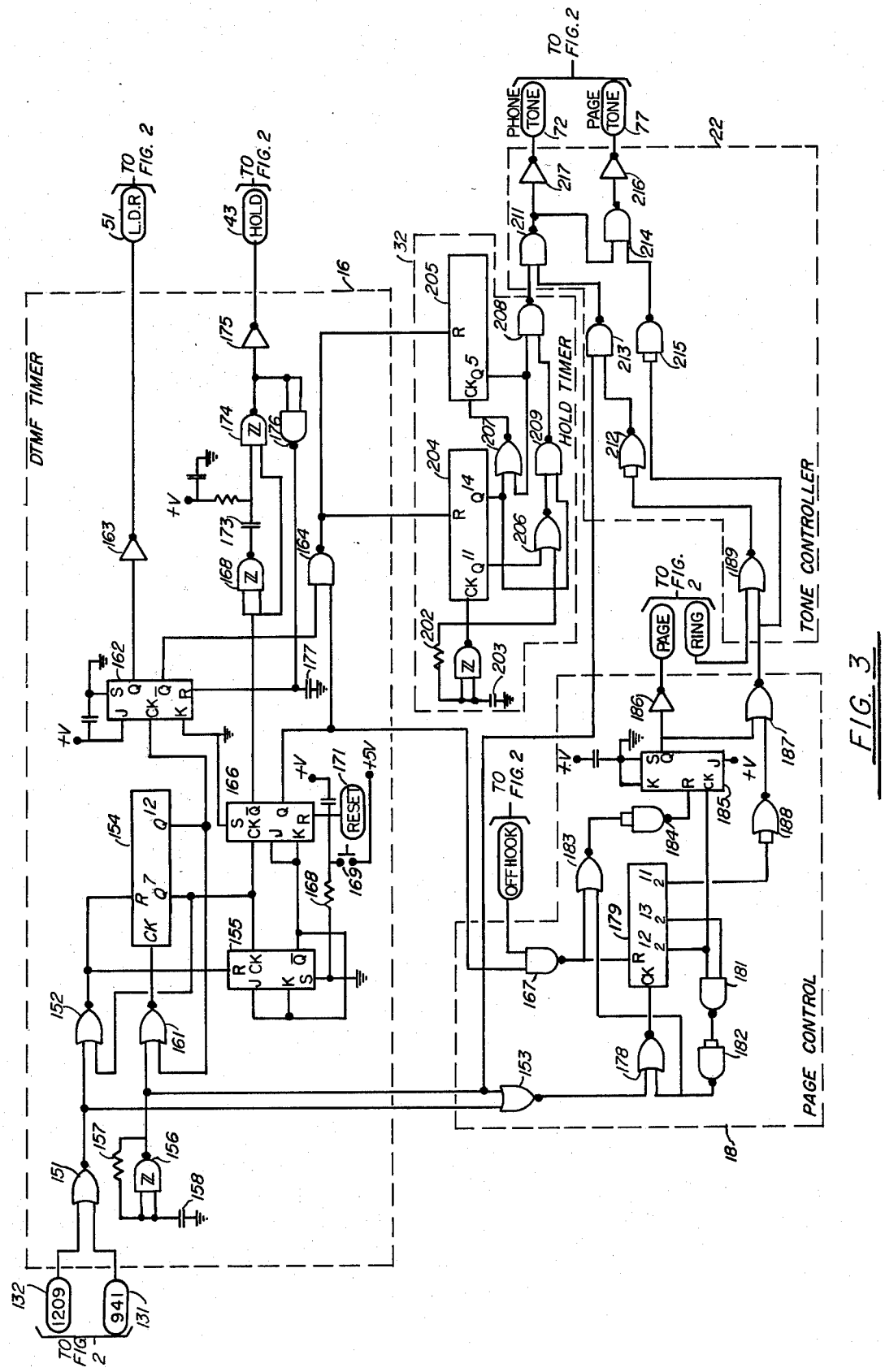
FIG. 3 is a circuit diagram of the logic section portion of the preferred embodiment of the apparatus of the present invention.
Figure 4:
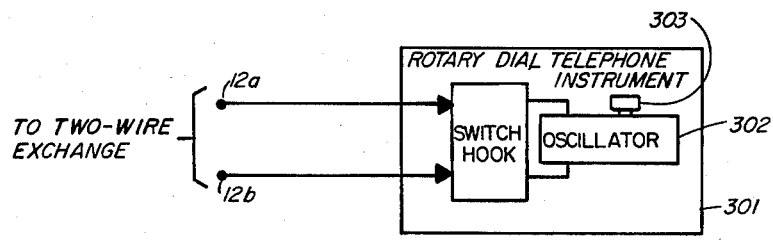
FIG. 4 is a block diagram of an auxiliary tone oscillator portion of an alternate embodiment of the system of the present invention, particularly for use of the system with rotary dial type telephones.

Referring now to FIGS. 2 and 3, there is shown, respectively, a schematic diagram of a portion of the circuitry of the invention shown in FIG. 1 as well as a circuit diagram of the logic used in connection with the circuitry of FIG. 2. A telephone line input from the central office exchange is connected to the first terminating means comprising terminals 11a and 11b while a DTMF telephone or modified rotary dial telephone instrument is connected to the second terminating means comprising terminals 12a and 12b. Initially, terminal 11a is connected through terminals 41a and 41e of a hold relay 41 to terminal 12a of the telephone instrument. Similarly, central office terminal 11b is connected through terminals 41d and 41h of the hold relay 41 to terminal 12b of the telephone instrument. The winding 42 of the hold relay 41 is connected from a positive voltage source on the side to a "hold" terminal 43 which is connected from the logic circuitry of FIG. 3. Presence of a ground potential on the "hold" terminal 43 operates a hold relay 41 and illuminates the LED 45. A capacitor 44 is connected across the winding 42 of the hold relay 41 while the LED 45 is coupled from a positive voltage through a resistor 46 to the "hold" terminal 43. The intercom or hold selector circuit 17 comprises the normally made contact 47 of the line disconnect (LD) relay 49. The winding 48 of the LD relay 49 is connected at one side to a positive voltage and, on the other, to an "LDR" terminal 51 which is similarly connected to the logic circuitry of FIG. 3. A capacitor 52 is connected across the windings 48 of the LD relay 49. An LED 53 is connected from a positive voltage through a resistor 54 to the "LDR" terminal 51. Presence of a ground potential on the "LDR" terminal operates the LD relay and illuminates the LED 53.

The intercom or hold selector circuit 17 is connected to the secondary windings of a coupling transformer 55 comprising a portion of the music on hold circuitry 27.

The primary windings of the transformer 55 are connected to terminals 56a and 56b for application of a music signal from an external source such as an am/fm tuner for the music on hold system. When the incoming line is placed on hold, via terminals 41b and 41c, music is coupled from the terminals 56a and 56b through the windings of transformer 55 onto the line of the holding party. A pair of diodes 57 and 58 are also connected across the primary windings of the coupling transformer 55. The purpose of the transformer and diode circuitry is principally to provide isolation protection for the telephone central office circuitry as required of the Federal Communications Commission. In the event of a malfunction in the music system, the circuit does not provide a load back to the central office exchange connected to terminals 11a and 11b. As can be seen, operation of the hold relay 41 places the incoming telephone line connected to terminals 11a and 11b into contact with the terminals 41b and 41c of the hold relay 41 to provide a d.c. holding current path for the central office exchange equipment via normally closed contact 47 of the line disconnect (LD) relay 49 and the secondary winding of the coupling transformer 55. It can be seen that upon operation of the line disconnect (LD) relay 49, contact 47 will open and allow the central office equipment to disconnect since there is no longer a holding circuit completed through the secondary winding of the transformer 55.

When the hold relay 41 is operated, the local telephone instrument connected to terminals 12a and 12b is coupled through relay contacts 41f and 41g to the input of the off-hook detector 19. The telephone circuit provides a positive voltage on terminals 12a which is coupled through base resistor 61 and emitter resistor 62 of transistor 63. Current flow through the transistor 64 produces a drop across a collector resistor 64 and bias resistor 65 to produce an off-hook signal on the "OFF HOOK" terminal 66 connected to the logic circuitry of FIG. 3. The page pick-off circuitry 33 comprises a coupling capacitor 67a, a fixed resistor 67 and a potentiometer 68. Adjustment of the potentiometer 68 varies the voice signal from the local telephone instrument to the desired magnitude. The output of the potentiometer 68 is connected to a normally open contact 69c of a page relay 69. Operation of the page relay closes the circuit to contact 69c and produces a signal on the page output terminal 71 which is connected to a speaker or public address system. A "PHONE TONE" terminal 72, connected from the logic circuitry of FIG. 3, is connected to a tone through phone circuit 28 comprising a fixed resistor 74, a variable resistor 75 and a coupling capacitor 76. A "PHONE TONE" signal, which may indicate the presence of an incoming call, signal the beginning of a page cycle, or signal the fact that a calling party has been "on hold" over three minutes, is coupled back to the local telephone instrument connected to terminal 12a via contacts 41f of the hold relay 41. The tone output driver 29 includes a fixed resistor 76 connected between a positive voltage source and the "PAGE TONE" terminal 77 connected from the logic circuit of FIG. 3. A potentiometer 78 permits adjustment of the level of the tone which is coupled through a capacitor 79 as an output signal. The page output switch 21 includes the page relay 69 having its winding 81 connected from a positive voltage source to the "PAGE" terminal 82 which is connected through an LED 83 and a resistor 84 so that presence of a ground potential on terminal 82 operates the page relay 69 and illuminates LED 83. Terminal 69a of the page relay 69 is used to loop music from the music in terminal 85 to the music out terminal 86 in order to mute the public address system music during a paging function.

Also connected to terminals 12a and 12b of the local telephone instrument is the tone pick-off circuit 14 comprising a pair of coupling capacitors 91 and 92 along with resistors 93, 97 and 94 and diodes 95 and 96. The presence of the diodes 95 and 96 is primarily for lightning protection. The pick-off circuit 14 connects the dual tone multifrequency signals or single tone of 3100 Hz generated by depression of the asterisk or single button for rotary dial telephone button of the local telephone instrument to the DTMF decoder or single tone decoder 15. The decoder 15 includes a pair of oscillator/frequency comparators 102 and 103 which function to produce outputs when either of the respective frequencies 941 Hz or 1209 Hz or 3100 Hz for rotary phones are present at the input. Dual tone multifrequency (DTMF) signals or single tone 3100 Hz for rotary telephones from the telephone appear at the coupling capacitor 106. Similarly, comparator 103 is tuned by means of fixed resistor 107, potentiometer 108 and capacitor 109. Additional tuning compacitors 111 and 112 are also coupled to comparator 102 while capacitors 113 and 114 are coupled to comparator 103. A bypass compacitor 115 is coupled to ground from a point between the two comparators 102 and 103. The output of comparator 102 is connected to a positive voltage through resistor 116 and to a "941" terminal 131 leading to the logic circuitry of FIG. 3. Similarly, the output of comparator 103 is coupled to a positive voltage through resistor 117 and to a "1209" terminal 132 connected to a logic circuitry of FIG. 3. By way of example, each of the comparitors 102 and 103 may comprise integrated circuits of the type LM567/a+. Functionally, the decoder 15 receives multifrequency tones applied to the input. In the event that one of those two signals is 941 Hz, then the normally high signal on the "941" terminal 131 goes low. Similarly, in the event one of the multi-frequencies applied to the input is 1209 Hz in frequency, the normally high "1209" terminal 132 goes low or a single decoder of 3100 Hz to input is 3100 Hz, the normally high then goes low.

The ring detector 34 is coupled to terminals 11a and 11b of the central office circuit and includes a capacitor 121 and a resistor 122 connected to the input of a lamp/photocell combination 123. When a 110 volt a.c. ringing signal is applied to terminals 11a and 11b, the signal will energize the lamp in the sealed unit 123 which, in turn, produces an output signal from the photocell in the form of an output pulse on the "RING" terminal 124, which is connected to the logic circuitry of FIG. 3. The output of the lamp/photocell combination 123 is connected to ground through a shunt resistor 125 and a shunt capacitor 126. Depression of test switch 127 simulates the appearance of ringing current and tests the operation of the ring detector by applying a pulse signal to the "RING" terminal 124. A signal on the "RING" terminal 124 produces an output from the tone controller 22 (FIG. 3) which is applied via the "PHONE TONE" terminal 72 and produces an audible tone indicator in the local telephone instrument and at terminal 77 to P.A. input if used.

Referring now to FIG. 3, there is shown the gating and logic circuitry comprising the DTMF or single tone (3100 Hz) timer 16, the page control circuit 18, the tone controller 22 and the hold timer 32. Terminals 131 and 132 are connected as the respective inputs of a NOR gate 151 the output of which is connected as one input of each of the two NOR gates 152 and 153. The output of gate 152 is connected to the reset input of a fourteen stage binary ripple counter 154 and to the reset input of a locking flip-flop 155. The Q7 output of the counter 154 is connected as the other input of the NOR gate 152. A schmitt trigger 156 is connected with a feedback resistor 157 and a capacitor 158 into the configuration of a stable oscillator operating at approximately 750 Hz. The output of the schmitt trigger 156 is connected to one input of the NOR gate 161, the output of which is connected as the clock input of the ripple counter 154. The Q12 output terminal of the counter 154 is connected to one input of the NOR gate 161. The Q12 output of the counter 154 is connected as the clock input of a driver flip flop 162 the Q output of which is coupled through a darlington driver 163 to the line disconnect relay (LDR) terminal 51. The $\overline{Q}$ output of the driver 162 is coupled to one input of a NAND gate 164. A bypass capacitor 165 is connected from the grounded set input to the J input of the driver flip flop 162. The K input of the driver flip flop 162 is connected to the S input of the flip flop 166 and is also grounded. The Q7 output of the counter 154 is connected as the clock input to both the locking flip flop 155 as well as the control flip flop 166. The Q output of the control flip flop 166 is connected to one input of a NAND gate 167 while the $\overline{Q}$ output of the flip flop 166 is connected to the input of the schmitt trigger 168. The J and K inputs of the locking flip flop 155 are coupled to its $\overline{Q}$ output and in turn to both the J and K inputs of the control flip flop 166. The set input of the locking flip flop 155 is connected to the reset input of the control flip flop 166 through a resistor 168 and to a positive voltage through a manual reset switch 169. The reset terminal of the flip flop 166 is connected to a "RESET" terminal 171 and to a positive voltage through a capacitor 172.

The output of the schmitt trigger 168 is connected through a coupling capacitor 173 to one input of another schmitt trigger 174 the other input of which is common with the input of the schmitt trigger 168. The output of the schmitt trigger 174 is connected through a darlington driver circuit 175 to the "HOLD" terminal 43 as well as to the common inputs of NAND gate 176 whose output is grounded through a capacitor 177.

Referring now to the page control circuit 18, the output of the NOR gate 153 is connected as one of the inputs of a NOR gate 178 the output of which is coupled to the clock input of a fourteen stage binary ripple counter 179.

The 2-12 output of the counter 179 is connected to one input of a NAND gate 181 and to the clock input of the flip flop 185. The 2-13 output of the counter 179 is connected to the other input of the NAND gate 181. The output of NAND gate 181 is connected to one input of NOR gate 178 and to one input of NOR gate 183, through NAND gate 182. The other input of the NOR gate 183 is connected to the reset input of the counter 179 and to the output of NAND gate 167. The other input of the NAND gate 167 is connected to the "OFF HOOK" terminal 66. The output of the NOR gate 183 is connected through NAND gate 184 to the reset input of a flip flop 185. The 2-12 output of the counter 179 is connected to the clock input of the flip flop 185. The Q output of the flip flop 185 is connected through a darlington driver 186 to the "PAGE" output terminal 82 which is coupled back to the schematic circuitry of FIG. 2. The Q output of the flip flop 185 is also connected to one input of a NOR gate 187 the other input of which is connected from the Q11 output of counter 179 through a NOR gate 188 to an input of a NOR gate 187. The output of the gate 187 is connected to one input of NOR gate 189 the other input of which is connected from the "RING" terminal 124 from the schematic circuitry of FIG. 2.

In looking at the logic circuitry of the hold timer 32 and the tone controller 22 we see a schmitt trigger 201 adapted to an oscillator configuration by means of a resistor 202 and capacitor 203 to produce an output frequency of about 1300 Hz which is connected to the clock input of a ripple counter 204. The reset input of both the counter 204 and a counter 205 is connected from the output of a NAND gate 164. The Q11 output of the counter 204 is connected to one input of a NOR gate 206 the other input of which is connected to the output of the schmitt trigger oscillator 201. The Q14 output of counter 204 is connected through NOR gate 207 to the clock input of the counter 205. The Q5 output of the counter 205 is connected to the other input of the NOR gate 207 and to one input of a NAND gate 208. The Q14 output of the counter 204 is also connected to one input of NAND gate 209 the other input of which is coupled from the output of NOR gate 206. The output of the NAND gate 209 is connected to one input of the NAND gate 208 the output of which is connected to one input of NAND gate 211. The output of the NOR gate 189 is connected to the common connected inputs of a NOR gate 212 whose output is connected to one input of NAND gate 213. The other input of a NAND gate 213 is connected from the output of the schmitt trigger 156. The output of the NAND gate 213 is connected as one of the inputs of the NAND gate 211. The output of NAND gate 211 is connected as one input to NAND gate 214 whose other input is connected from the output of the NOR gate 187 through a NOR gate 215. The output of the NAND gate 214 is connected through a darlington driver circuit 216 to the "PAGE TONE" output terminal 77. The output of the NAND gate 211 is also connected through a darlington driver circuit 217 to the "PHONE TONE" output terminal 72.

PAGE MODE

In describing the operation of FIGS. 2 and 3 of the paging mode, let us assume that an incoming call requires placing the calling party on hold and paging for the desired recipient of the telephone call. Depression of the asterisk button on the local telephone instrument applies a dual tone multifrequency signal or a single 3100 Hz tone for rotary dial telephones on the terminals 12a and 12b which is coupled through the tone pick-off circuit 14 to the input of the DTMF or single tone (3100 Hz) decoder 15. Since the DTMF or single tone for rotary dial signals generated by the asterisk button or single tone rotary button of the telephone instrument correspond to the frequencies of which comparators 102 and 103 are tuned in the preferred embodiment of the invention, i.e. 941 Hz and 1209 Hz or single tone (3100 Hz) for rotary phones, the normally high signals on both the terminals 131 and 132 or terminal 131 for 3100 Hz go low so as to apply a low voltage to both of the inputs of the NOR gate 151 and produce a high on the output thereof. The high output from the NOR gate 151 causes the output of the NOR gate 152 to also go high which resets both the locking flip flop 155 and the ripple counter 154. Oscillations from the schmitt trigger 156 having a frequency of about 750 Hz are coupled through the NOR gate 161 to the clock input of the counter 154 and a count begins to accumulate. For a frequency of 750 Hz the period of each cycle is about 1.4 milliseconds, therefore the Q7 output of the counter 154 goes high after approximately 128 counts or a passage of about 160 milliseconds. This high clocks both the flip flop s 155 and 166 to produce a low output on the Q lead of control flip flop 166 which is gated through schmitt triggers 168 and 174 and which produce a low at the output of the darlington driver 175 and on the "HOLD" terminal 43. Referring back to FIG. 2, it can be seen that a low on the "HOLD" terminal 43 causes current to flow through the windings 42 of the hold relay 41 and produce operation of the relay. Operation of the hold relay 41 places a d.c. holding current path between terminals 11a and 11b through the contacts 47 of the line disconnect relay 49 and the secondary winding of the coupling transformer 55. A music on hold signal is connected to terminals 56a and 56b and is applied to the holding party's line through coupling transformer 55 and the normally closed contact 47 of the LD relay 49.

Referring back to FIG. 3, when the circuit is on "HOLD" a signal is fed from the Q lead of flip flop 166 to one input of NAND gate 167. This is the first of two criteria to begin actuation of the page control circuit 18. The second criterion is that a true signal be present on the "OFF HOOK" terminal 66 from the off-hook detector 19 (FIG. 2). In the event the telephone receiver has been replaced on hook after hold is effectuated, the paging cycle will not be energized. The connection between the output of NOR gate 151 and the input of NOR gate 153 ensure no paging operation will begin until the asterisk button is no longer depressed. True signals on both inputs of NAND gate 167 release the reset input of counter 179 and it begins to accumulate counts from oscillator 156 through NOR gates 153 and 178 to the clock input of counter 179. After about two seconds from beginning to accumulate a count in counter 179, the counter lead 2-11 goes high. The high signal on lead $Q^{11}$ is coupled through NOR gate 188 to take one input of NOR gate 187 high. Since the other input of gate 187, the Q output of flip flop 185 is still low, the output of NOR gate 189 goes high. The high on gate 189 is connected through NAND gate 212 to place a high on one input of NAND gate 213, the other input of which is connected to the 750 Hz signal from oscillator 156. When the switching input of NAND gate 213 is high the 750 Hz tone is fed through NAND gates 213 and 211 and the darlington driver 217 to the "PHONE TONE" output terminal 72. The high output from NOR gate 187 is coupled through NAND gate 215 to switch the NAND gate 214 and feed the 750 Hz tone through the darlington driver 216 to the "PAGE TONE" output terminal 77. The page tone amplitude is regulated by coupling the tone signal from FIG. 3 into the tone output driver of FIG. 2. The signal is applied between the bias resistor 76 and the potentiometer 78 to couple a tone output through the capacitor 79. Thus, a tone is applied to the receiver of the local telephone instrument to indicate paging can begin. When the 2-12 lead of counter 179 goes high, after approximately four seconds, an input is provided to the clock input of flip flop 185 and the Q output goes high. A signal on the Q output of flip flop 185 applies a signal through darlington driver 186 to the "PAGE" terminal 82. The page relay 69 (FIG. 2) is operated to connect a page audio signal out through terminal 71 and to open the connection between terminals 85 and 86 and mute the music over the public address system. The high on the $\overline{Q}$ output of flip flop 185 switches the output of NOR gate 187 low to terminate the page tone before paging begins.

When the signal on lead 2-13 of counter 179 goes high, approximately seven seconds after paging was begun, both inputs of NAND gate 181 are high to pass a signal through NAND gate 182, NOR gate 183 and NAND gate 184 to the reset input of flip flop 185. Resetting of flip flop 185, removes the signal from the "PAGE" terminal 82 to release the page relay 69 and terminate the paging operation.

When the paged party answers and connects another local telephone instrument to terminals 12a and 12b conversation may take place. If either or both local parties desire to speak to the calling party, depression of the asterisk button on one of the instruments couples DTMF tones or single button for 3100 Hz for rotary dial phones through circuit 14, decoder 15 and timer 16 to release the signal on the "HOLD" terminal 43. Release of the hold relay 41 connects the calling parties line to terminals 12a and 12b for conversation.

In the event the paged party does not answer the first page, paging may be repeated as follows: since the calling party is still on hold and the local instrument is still off hook the output of NAND gate 167 delivers a release signal to the reset lead of timer 179. Depression of the switch hook of the local telephone instrument delivers a reset pulse to the reset lead of counter 179 and starts it counting oscillator pulse again to repeat the page cycle described above.

HOLD TIMER

If the paged party failes to answer or the local party forgets that the calling party is on hold, a hold warning tone is applied to the local telephones and local P.A. system after about three minutes on hold. Referring to FIG. 3, when the circuit is on hold and the flip flop 162 is reset the output of NAND gate 164 is low to release the reset inputs of hold warning tone counters 204 and 205. Oscillator schmitt trigger 201, operating at about 1300 Hz feeds signals to the clock input of counter 204 which accumulates the counts. The Q14 output is coupled through NOR gate 207 to accumulate a count in counter 205. After about three minutes the Q5 lead goes high which inhibits the operation of NOR gate 207 and blocks any additional oscillator signals to counter 205. The high on Q5 is also connected to one input of NAND gate 208. Counter 204 is still cycling signals from oscillator 202 and each time Q11 goes high while Q14 is low, it gates the oscillator frequency through NOR gate 206, NAND gates 209, 208 and 211 to the "PHONE TONE" output terminal 72 through the darlington driver 217. The tone is also applied from the output of NAND gate 211 through NAND gate 214 and darlington driver 216 to the "PAGE TONE" terminal 77. Thus, the tone is applied to the local telephone instrument and the P.A. system. Since Q11 goes high about once each second, a series of intermittent tones, once per second, is applied to the outputs. When Q14 switches high, after about four seconds, the high on the input of gate 209 inhibits passage of the tone and produces silence for about six seconds. After the six seconds, Q14 goes low again and the spaced tones are repeated.

INTERCOM MODE

In the event intercom function is desired the first criterion, the signalling button is depressed for a second preselected period (e.g. 2.7 seconds or single button on rotary dial sets to encode an output of 3100 Hz or DTMF signal of 1209 and 941 Hz) rather than the shorter first preselected period measured in milliseconds. Counter 154 will continue to count pulses from NOR gate 161 as long as a high remains on terminals 131 and 132 and therefore gates 151 and 152. That is, as long as the asterisk button remains depressed, the counter 154 continues to count and the locking flip flop 155 holds the control flip flop 166 "set". The principal function of locking flip flop 155 is to prevent the control flip flop 166 from resetting as long as the asterisk button or single tone button is depressed. The Q12 output of the counter 154 goes high after approximately 1024 counts or a passage of about 2.7 seconds. When Q12 goes high it opens NOR gate 161 and stops the counter 154 from receiving signals from the oscillator 156. The high on the Q12 terminal also clocks driver flip flop 162 which places a low on the "LDR" terminal 51 through the darlington driver 163. Referring back to FIG. 2, a low on "LDR" terminal 51 operates the LD relay 49 and opens contacts 47 to present an open line to central office exchange terminals 11a and 11b. At the same time, the second criterion of (OFF-HOOK) detection of the telephone is detected at terminal 66 from the off-hook detector (FIG. 2). True signals on both inputs of NAND gate 167 release the reset input of counter 179 and it begins to accumulate counts from oscillator 156 through NOR gates 153 and 178 to the clock input of counter 179. After about two seconds from beginning to accumulate a count in counter 179, the counter lead $Q^{11}$ is coupled goes high. The high signal on lead $Q^{11}$ is coupled through NOR gate 188 to take one input of NOR gate 187 high. Since the other input of gate 187, the Q input of flip flop 185, is still low the output of NOR gate 189 goes high. The high on gate 189 is connected through NAND gate 212 to place a high on one input of NAND gate 213, the other input of which is connected to the 750 Hz signal from oscillator 156. When the switching input of NAND gate 213 is high the 750 Hz tone is fed through NAND gates 213 and 211 and the darlington driver 217 to the "PHONE TONE" output terminal 72. The high output from NOR gate 187 is also coupled through NAND gate 215 to switch the NAND gate 214 and feed the 750 Hz tone through the darlington driver 216 to the "PAGE TONE" output terminal 77. The page tone amplitude is regulated by coupling the tone signal from FIG. 3 into the tone output driver of FIG. 2. The signal is applied between the bias resistor 76 and the potentiometer 78 to couple a tone output through the capacitor 79. Thus a tone is applied to the receiver of the local telephone instrument to indicate paging can begin. When the $Q^{12}$ lead of counter 179 goes high, after approximately 4 seconds, an input is provided to the clock input of flip flop 185 and the Q output goes high. A signal on the Q output of flip flop 185 applies a signal through darlington driver 186 to the "PAGE" terminal 82. The page relay 69 (FIG. 2) is operated to connect a page audio signal out through terminal 71 and to open the connection between terminals 85 and 86 and mute the music over the public address system. The high on the $Q^{12}$ lead of flip flop 185 switches the output of NOR gate 187 low to terminate the page tone before paging begins.

When the signal on lead $Q^{13}$ of counter 179 goes high, approximately seven seconds after paying was begun, both inputs of NAND gate 181 are high to pass a signal through NAND gate 182, NOR gate 183 and NAND gate 184 to the reset input of flip flop 185. Resetting of flip flop 185, removes the signal from the "PAGE" terminal 82 to release the page relay 69 and terminate the paging operation.

In the event the paged party does not answer the first page, paging may be repeated as follows: Since the local instrument is still off-hook the output of NAND gate 167 delivers a release signal to the reset lead of timer 179. Depression of the switch hook of the local telephone instrument delivers a reset pulse to the reset lead of counter 179 and starts it counting oscillator pulse again to repeat the page cycle described above. The third criterion is, the system of FIG. 2 appears at terminals 11a and 11b to have gone on-hook while talking battery remains for intercom communication between telephone instruments connected to terminals 12a and 12b. Thus, the system is free to receive outside calls while being used in the intercom mode. An incoming call is signalled by the ring detector 34 as is described below. Returning to the logic diagram of FIG. 3, when the driver flip flop 162 is set, indicative of an intercom function, the $\overline{Q}$ output produces a low which gates a high from the output of NAND gate 164 and places a high on the reset inputs of counters 204 and 205. These counters 204 and 205 are used to time the application of tones to the line after a party has been on hold longer than three minutes. Since in the mode under consideration the system is only being used for inhouse intercom, and not for hold, operation of the hold warning tone control counters 204 and 205 is thus disabled.

Referring to FIG. 2, in the event there is an incoming call on terminals 11a and 11b while the system is in the intercom mode, 20 Hz a.c. ringing current is coupled through capacitor 121 and resistor 122 to illuminate the lamp within the lamp/photocell combination 123. Illumination of the lamp produces an output pulse from the photocell which is applied to the "RING" terminal 124. Referring to FIG. 3, a high on the "RING" terminal 124 switches a high onto the output of NOR gate 189 which, in turn, gates a high through NAND gate 212 to the control input of NAND gate 213. When the control input of gate 213 is high the 750 Hz tone from the oscillator 156 is fed through NAND gates 213 and 211 and the darlington drive 217 to the "PHONE TONE" output terminal 72. Referring to FIG. 2, the tone is applied to each telephone instrument connected to terminals 12a and 12b to indicate there is an incoming call. Depression of the asterisk button or single tone button on one of the telephone instruments applies DTMF or single tone (3100 Hz) tones through pick-off circuit 14 and DTMF or single tone decoder 15 to trigger the DTMF or single tone timer 16 and incorporate the hold relay 41 to connect the calling party to terminals 12a and 12b for conversation.

Figure 5A:
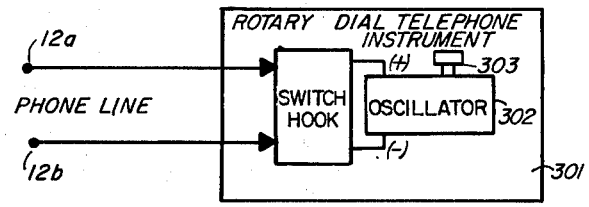
FIG. 5a is a block diagram of an auxiliary tone oscillator portion of an alternate embodiment of the system of the present invention, particularly for use of the system with rotary dial type telephones, further illustrating positive and negative poles.
Figure 5B:
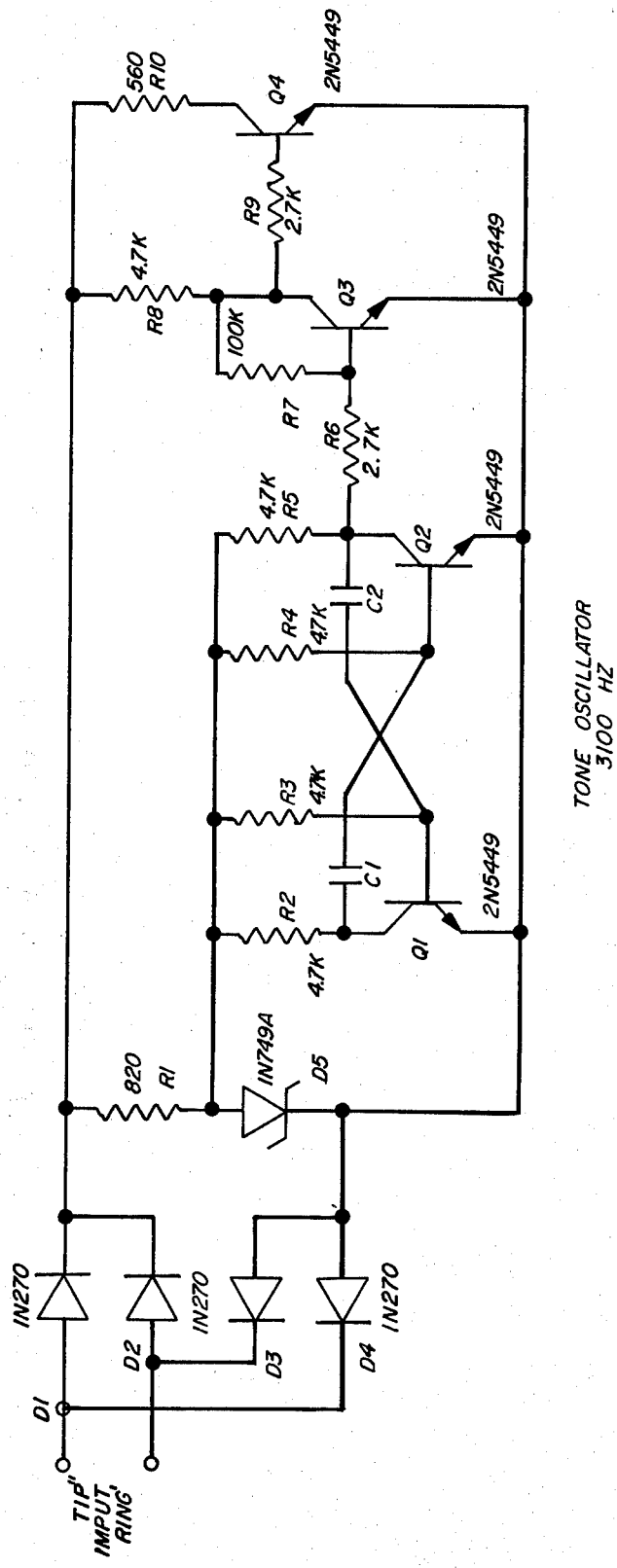
FIG. 5b is a circuit diagram of an auxiliary tone oscillator portion of an alternate embodiment of the system of the present invention, particularly for use of the system with rotary dial type telephones.

Referring now to FIGS. 5a and 5b there is shown an additional element which is included in an alternate embodiment of the invention useful with telephone instruments employing rotary dial signalling equipment. As shown in FIG. 5A a telephone instrument employing rotary dial signalling 301 is connected to local telephone terminals 12a and 12b. An oscillator 302 is connected to the line on the other side of the switch hook therefrom. The oscillator 302 includes a separate actuation switch 303 which applies tones from the oscillator 302 which preferably generates tones to which the system of FIG. 2 is responsive to initiate all the above described hold and intercom functions. For example, the unit of FIG. 5 would function satisfactorily with the system of FIG. 2 if depression of the button 303 caused the oscillator to generate both a 941 Hz tone and a 1209 Hz tone. Alternatively, for cost saving considerations, the oscillator may only generate a single tone, e.g. 3100 Hz. By returning the DTMF decoder 15 by disabling one of the oscillator/comparators 101 or 102 (FIG. 2) and tuning the other to produce an output signal upon receipt of the frequency of oscillator 302 the system will operate satisfactorily on a single frequency signal.

It is thus believed that the operation and construction of the present invention will be apparent from the foregoing description. While the apparatus as shown and described has been characterized as being preferred, it will be obvious that various changes and modifications may be made therein without departing from the spirit and scope of the invention as defined in the following claims.

I claim:

1. A two wire telephone system, comprising:
   first terminating means for connection to an incoming central office line;
   second terminating means for connection to a local telephone instrument;
   a DTMF timer circuit;
   phone line switch means for selectively connecting said first and second terminating means;
   means responsive to a preselected signal tone of a first preselected duration from said telephone instrument for actuating said DTMF timer circuit;
   means responsive to a first value in said DTMF timer circuit for actuating said switching means to disconnect said first and second terminating means from one another and connect said first terminating means to a conductive holding path and to a source of music signals; and
   means responsive to said preselected signal tone of a first preselected duration from said local telephone instrument for disconnecting said first terminating means from said holding path and music signals and connecting it to said second terminating means.

2. A two wire exchange telephone system, comprising:
   first terminating means for connection to an incoming central office line;
   second terminating means for connection to a local telephone instrument;
   a DTMF timer curcuit;
   phone line switch means for selectively connecting said first and second terminating means;
   means responsive to a preselected signal tone of a first preselected duration from said telephone instrument for actuating said DTMF timer circuit;
   a page control circuit;
   means responsive to a first value in said DTMF timer circuit for actuating said switch means to disconnect said first and second terminating means from one another and connect said first terminating means to a conductive holding path and to a source of music signals;
   means responsive to actuation of said phone line switch means and an off hook condition of said local telephone instrument for actuating said page control circuit;
   means responsive to a signal from page control circuit for placing a page tone in said local telephone instrument;
   means responsive to a second signal from page control circuit for interrupting said page tone and connecting said local telephone instrument to a speaker system for paging;
   means responsive to a third signal from page control circuit for disconnecting said local telephone instrument from said speaker system and inhibiting operation of said page control circuit; and
   means responsive to said preselected signal tone of a first preselected duration from said local telephone instrument for disconnecting said first terminating means from said holding path and music signals and connecting it to said second terminating means.

3. A two wire exchange telephone system as set forth in claim 2 which also includes:
   means responsive to an actuated phone line switch means and a brief depression of the switch hook of the local telephone instrument for reactuation of said second timing means.

4. A two wire exchange telephone system as set forth in claim 2 which also includes:
   a hold timer circuit;
   means responsive to operation of said phone line switch for actuating said hold timer circuit; and
   means responsive to operation of said hold timer for applying a hold warning tone to both said first and second terminating means.

5. A two wire exchange telephone system as set forth in claim 2 which also includes:
   means responsive to a preselected signal tone of a second preselected duration from said telephone instrument for interrupting the connection between said fist terminating means and said current holding path to present an unoccupied line condition back to the central office.

6. A two wire exchange telephone system as set forth in claim 5 which also includes:
   means connected to said first terminating means and responsive to a.c. ringing current for applying an indicating tone to said second terminating means.

7. A method for switching a two wire exchange system including a selectively connectable incoming central office line and a local telephone instrument, said method comprising:
   providing a DTMF timer circuit;
   actuating said DTMF timer circuit in response to a preselected signal tone of a first preselected duration from said local telephone instrument;
   disconnecting said central office line and said local telephone instrument and reconnecting said central office line to a conductive holding path and a source of music signals in response said DTMF timing means reaching a first value;
   providing a page control circuit;
   actuating said page control circuit in response to disconnection of said central office line and said local telephone instrument and the presence of an off hook condition in said local telephone instrument;
   operating a page tone in said local telephone instrument in response to said page control circuit generating said first signal;

interrupting the page tone and connecting the local telephone instrument to a speaker system for paging in response to said page control circuit generating a second signal;

disconnecting the local telephone instrument from said speaker system and inhibiting operation of said page control circuit in response to said page control circuit generating third signal; and disconnecting said central office line from said holding path and music signals and connecting it to said local telephone instrument in response to said preselected signal tone of a first preselected duration from said local telephone instrument.

8. A method of switching a two wire exchange system as set forth in claim 7 wherein the method also includes the step of:

reactuating said page control circuit in response to a state of disconnection between said central office line and said local telephone instrument and a brief depression of the switch hook of said local telephone instrument.

9. A method of switching a two wire exchange system as set forth in claim 7 wherein the method also includes the steps of:

providing a hold timer circuit;

actuating said hold timer circuit in response to disconnection of said central office line and said local telephone instrument and reconnection of said central office line to a conductive holding path and a music source; and applying a hold warning tone to said local P.A. input and telephone instrument in response to said hold timing circuit reaching a first alue.

10. A method of switching a two wire exchange system as set forth in claim 7 wherein the method also includes the step of:

interrupting the connection between said central office line and said current holding path in response to a preselected signalling tone of a second preselected duration from said telephone instrument to present an unoccupied line condition back to the central office.

11. A method of switching a two wire exchange system as set forth in claim 7 wherein the method also includes the step of:

applying an indicating tone to said local telephone instrument and to P.A. input in response to a.c. ringing current on said central office line.

* * * * *